United States Patent [19]

Tomikawa et al.

[11] 3,927,159
[45] Dec. 16, 1975

[54] METHOD OF FORMING A DIMENSIONALLY ACCURATE FOAMED POLYETHYLENE RESIN PRODUCTS

[75] Inventors: Masami Tomikawa; Hideo Ohkawa; Akiji Tsunoda, all of Chiba, Japan

[73] Assignee: Idemitsu Kosan Company Limited, Japan

[22] Filed: Oct. 29, 1973

[21] Appl. No.: 410,335

[30] Foreign Application Priority Data
Nov. 9, 1972  Japan............................ 47-111640

[52] U.S. Cl. ........ 264/45.3; 260/2.5 HA; 260/42.24; 260/42.39; 264/54; 264/331; 264/DIG. 17; 264/DIG. 18
[51] Int. Cl.² ........................................ B29D 27/00
[58] Field of Search . 264/54, 55, DIG. 17, DIG. 18, 264/DIG. 16, DIG. 5, 331, 45.3; 260/2.5 HA, 42.24, 42.39

[56] References Cited
UNITED STATES PATENTS

| | | | |
|---|---|---|---|
| 3,010,916 | 11/1961 | Pooley | 264/55 X |
| 3,137,745 | 6/1964 | Johnstone | 264/DIG. 18 |
| 3,341,480 | 9/1967 | Feild | 264/DIG. 18 |
| 3,341,481 | 9/1967 | Palmer | 264/55 X |
| 3,452,123 | 6/1969 | Beckmann et al. | 264/DIG. 18 |
| 3,651,183 | 3/1972 | Hosoda et al. | 264/54 |
| 3,818,086 | 6/1974 | Stastny et al. | 264/DIG. 5 X |

*Primary Examiner*—Philip Anderson
*Attorney, Agent, or Firm*—McGlew & Tuttle

[57] ABSTRACT

The present invention relates to a method of preparing a foamed polyethylene resin product with a shape similar to that of the mold.

To be more precise, the present invention provides a method of controlling deformation of a foamed polyethylene resin product at the time when the product is released from mold.

6 Claims, 3 Drawing Figures

METHOD OF FORMING A DIMENSIONALLY ACCURATE FOAMED POLYETHYLENE RESIN PRODUCTS

BACKGROUND AND SUMMARY OF THE INVENTION

The conventional method of preparing a foamed molding with a concave or convex shape has consisted of foaming thermoplastic resins such as polyethylene resin, polyvinyl chloride resin, polymethacrylate resin, polyolefin resin, and the like resin, to make a plate-like foamed material and then forming the desired concave or convex shape from the thus obtained foamed material using force planger with concave or convex shape at an elevated temperature. However, a foamed molding obtained according to the conventional method does not have a uniform density and shows the defect that its surface is partially poor in shock-absorbability with lowered foaming magnification, while dimensional accuracy of the molding was greatly reduced in the case of producing a molding with high foaming magnification.

As the conventional method is a two step process, it cannot be said to be advantageous from the economic viewpoint. The method of producing a concave or convex shape by stamping out, cutting or shaving has been also utilized. However, it requires so much time and labor that a successive operation is impossible and it cannot be considered as an industrial method. It also possesses the defect that the manufacturing of a molding with a complicated shape is difficult.

For the purpose of overcoming such defects and obtaining a foamed molding by a one step process, the inventors tried to prepare a foamed molding by charging the mixture of polyethylene resin, a foaming agent and a cross-linking agent in a closed mold with concave or convex shape and foaming it at an elevated temperature. As a result, a foamed molding obtained after release from the mold was found to be greatly deformed and significatnly different from the form of the mold.

The inventors made incessant and concentrated studies on developing the method of controlling deformation of a foamed molding at the time when the molding is released from the mold and obtaining the molding with favourable dimensional accuracy and similar shape to that of a mold by a one step process. As a result, it has been found that deformation of a foamed molding at the time of releasing can be controlled by adding a specific amount of an inorganic calcium compound as well as a foaming agent and a cross-linking agent to polyethylene resin and a foamed molding with a similar shape to that of the mold can be obtained. Moreover, said foamed product has a favorable dimensional accuracy and uniform foaming magnification. Thus, the inventors have succeeded in completing the present invention on the basis of this finding.

DETAILED DESCRIPTION OF THE INVENTION

Figure 1:
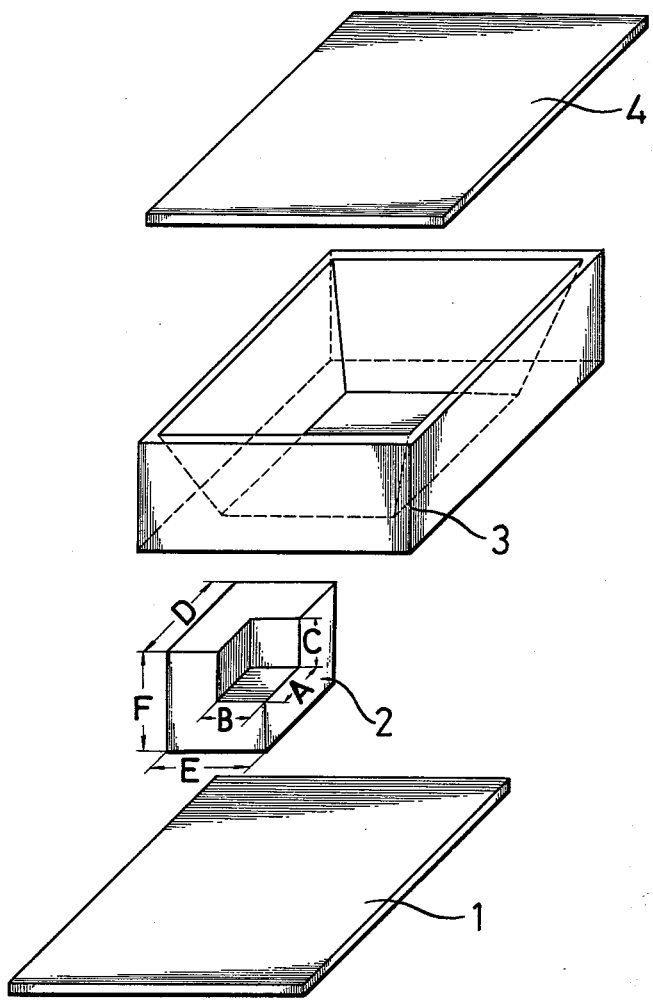
FIG. 1 shows an exploded perspective view of the closed mold.

The present invention relates to a method of preparing a foamed polyethylene resin product with similar shape to that of a mold.

To be more precise, the present invention provides a method of controlling the deformation of a foamed polyethylene resin product at the time when the product is released from mold. That is, this invention comprises mixing together polyethylene resin with more than 30 weight parts of an inorganic calcium compound based on 100 weight parts of the resin, a small amount of a foaming agent and a cross-linking agent, charging the mixture to a mold with a predetermined shape and foaming said mixture in the mold at an elevated temperature.

In the present invention, an inorganic calcium compound must be mixed with polyethylene resin as additive ingredient for the purpose of the controlling deformation of foamed molding to obtain a foamed product having a similar shape to that of the mold. The inorganic calcium compounds used for this invention are inorganic substances containing calcium as one ingredient, for instance, calcium carbonate, calcium sulfate, calcium sulfite, calcium hydroxide and calcium silicate, with particular preference being given to calcium sulfite. They are usually used in powder form with particle size of less than $10\mu$. In this invention, it is required to mix these inorganic calcium compounds with polyethylene resin at the ratio of more than 30 weight parts per 100 weight parts of the resin. When the amount of calcium compound is less than 30 weight parts, deformation of the product occurs at releasing time. Accordingly, foamed moldings with a complicated shape cannot be made successfully. These inorganic calcium compounds also possess the activity of giving the molding a uniform foaming structure, and the density and shock-absorbability of the so obtained moldings are uniform.

The polyethylene resin to be used in this invention is not limited to polyethylene itself, and its copolymers and blends such as high pressure process polyethylene, ethylene-vinyl acetate copolymer and blend of medium pressure process polyethylene and ethylene-vinyl acetate copolymer can also be utilized. As a foaming agent, azodicarbonamide, diphenyl sulfone-3,3'-disulfohydrazide, benzyl sulfonic acid-diphenyl hydrazide, which are commonly used, can be used. As a cross-linking agent, the organic peroxides such as 2,5-dimethyl-2,5-di(tertiary butyl peroxy) hexene-3, dicumyl peroxide, di(tertiary butyl peroxy isopropyl) benzene and the like are used. In addition, other auxiliary additives such as lubricant, coloring matter, pigment etc. can be used, if desired.

In effecting the present invention, each predetermined amount of aforementioned foaming agent, cross-linking agent and inorganic calcium compound is added to polyethylene resin and the mixture is kneaded for 5–7 min. at a temperature of from 90° to 100°C with suitable kneading means such as inter mixer, Banbury mixer, etc.

The thus obtained mixture is placed in a predetermined shape of a closed mold and heated at a temperature of from 180° to 200°C for 10–25 min. under pressure. Then the mold is instantaneously opened. By this procedure, the foamed molding with a similar shape to that of the mold appears along the edge lines of the mold and said molding is taken out as product. When polyethylene resin without inorganic calcium compound is used according to the conventional method, significant deformation occurs in the obtained molding.

In effecting foam molding according to the present invention, deformation at releasing time is controlled and favourable molding with extremely high dimensional accuracy and similar shape to that of the mold is obtained.

The industrial significance of this invention is extremely great because a foamed molding with complicated shape, for example concave or convex shape, can be produced by a one step process. A special feature of the present invention is to add a specific amount of inorganic calcium compound to polyethylene resin, which is different from conventional methods. Especially, according to this invention, deformation is not seen even when obtaining a foamed molding with high foaming magnification, and a molding with favorable dimensional accuracy is obtained.

As the method of this invention can control deformation of molding at the time of releasing from the mold and make a molding with a similar shape to that of the mold, shock-absorbing materials, packing materials, toys, construction materials, etc., with a shape suitable for the intended use can be made with a one step process by deciding the shape of the pertinent mold.

The present invention is further illustrated in the folliwng example.

EXAMPLE

To polyethylene resin (density 0.923, melt index 5.0), each predetermined amount of inorganic calcium compound, azodicarbonamide and 1,3-bis(tertiary butyl peroxy isopropyl) benzene was added. The mixture was kneaded using an inter mixer at a temperature of from 90° to 100°C.

Then, the kneaded product was placed in a predetermined closed mold and heated under a pressure of 30 kg/cm$^2$ at a temperature of from 180° to 200°C for a predetermined period of time. Subsequently, by opening the mold instantaneously, foaming material was obtained.

Figure 2:
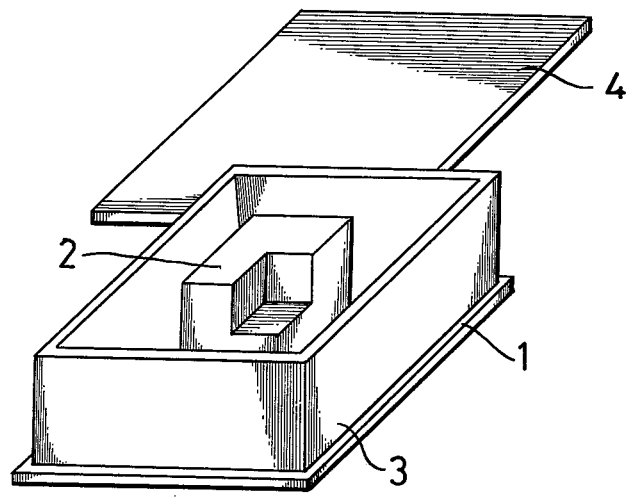
FIG. 2 is a perspective view showing the assembled mold with lid (4) removed.

Referring to FIG. 1 of the drawings, the mold used in this example consisted of the parts bottom plate 1, mold 2, frame 3 and lid 4. These parts are assembled as shown in FIG. 2 at the time of utilizing and filled with the mixture, then closed up with lid 4. The dimension of each part of mold 2 is illustrated as follows:

A: 100 mm   B: 100 mm
C: 100 mm   D: 200 mm
E: 200 mm   F: 200 mm

Figure 3:
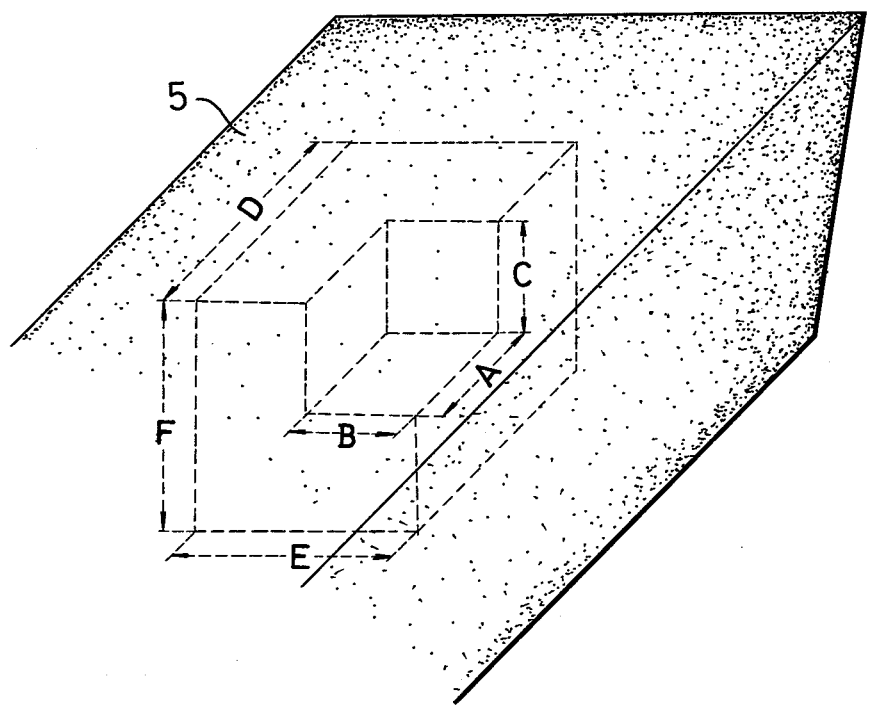
FIG. 3 is a partial view in perspective of the so-obtained molding using the mold according to the invention.

The thus obtained molding possesses the spatial structure corresponding to the form of mold 2 in block 5 as shown in FIG. 3.

Table 1 shows the kinds of materials and conditions for foam molding and Table 2 the property of so obtained molding and spatial dimension within the molding corresponding to the aforementioned mold 2. The degree of deformation of the molding is evaluated by comparing the spatial dimension with that of the aforementioned mold 2.

TABLE 1

Composition of Foaming Material

| Ex. | Polyethylene (weight parts) | Inorganic Calcium Compound Substance | Inorganic Calcium Compound Quantity (weight parts) | Foaming Agent (weight parts) | Cross-linking Agent (weight parts) | Time of Kneading (min.) | Density (g/cm$^3$) | Time of Foaming (min.) |
|---|---|---|---|---|---|---|---|---|
| 1. | 100[1] | — | — | 6.0 | 0.50 | 9 | 0.93 | 18 |
| 2. | 100[1] | — | — | 6.0 | 0.50 | 9 | 0.93 | 17 |
| 3. | 100[1] | — | — | 6.0 | 0.50 | 9 | 0.93 | 14 |
| 4. | 90[1] | CaSO$_3$ | 10 | 6.0 | 0.40 | 7 | 0.95 | 16 |
| 5. | 90[1] | ibid. | 10 | 6.0 | 0.35 | 7 | 0.95 | 15 |
| 6. | 70 | ibid. | 30 | 5.5 | 0.30 | 5 | 0.97 | 22 |
| 7. | 70 | ibid. | 30 | 5.5 | 0.30 | 5 | 0.97 | 20 |
| 8. | 50 | ibid. | 50 | 4.5 | 0.27 | 5 | 1.1 | 22 |
| 9. | 50 | ibid. | 50 | 4.5 | 0.27 | 5 | 1.1 | 21 |
| 10. | 50 | ibid. | 50 | 4.5 | 0.27 | 5 | 1.1 | 20 |
| 11. | 40 | ibid. | 60 | 5.2 | 0.25 | 5 | 1.2 | 20 |
| 12. | 40 | ibid. | 60 | 5.3 | 0.25 | 5 | 1.2 | 18 |
| 13. | 40 | ibid. | 60 | 5.0 | 0.25 | 5 | 1.2 | 17 |
| 14. | 40 | ibid. | 60 | 4.5 | 0.25 | 5 | 1.3 | 15 |
| 15. | 40 | ibid. | 60 | 3.5 | 0.20 | 5 | 1.3 | 13 |
| 16. | 40 | ibid. | 60 | 3.0 | 0.20 | 5 | 1.3 | 13 |
| 17. | 40 | ibid. | 60 | 2.0 | 0.20 | 5 | 1.3 | 13 |
| 18. | 30 | ibid. | 70 | 4.7 | 0.25 | 5 | 1.4 | 14 |
| 19. | 30 | ibid. | 70 | 3.0 | 0.23 | 5 | 1.4 | 13 |
| 20. | 30 | ibid. | 70 | 2.5 | 0.20 | 5 | 1.4 | 12 |
| 21. | 30 | ibid. | 70 | 2.0 | 0.20 | 5 | 1.4 | 12 |
| 22. | 30 | ibid. | 70 | 1.5 | 0.15 | 5 | 1.5 | 12 |
| 23. | 40 | CaSO$_4$ | 60 | 3.0 | 0.20 | 5 | 1.3 | 13 |
| 24. | 40 | CaCO$_3$ | 60 | 3.0 | 0.20 | 5 | 1.3 | 13 |

Note: [1] 0.1 weight part of zinc stearate was added.

TABLE 2

| Ex. | Density (g/cm$^3$) | Shock-absorbing Properties G*[1] | Shock-absorbing Properties Strain(%) | Foamed Product Surface Hardness *2 | Dimensions (mm) A | B | C | D | E | F |
|---|---|---|---|---|---|---|---|---|---|---|
| 1. | 0.07 | 33 | 13.8 | 36 | 200 | 289 | 230 | 409 | 501 | 388 |
| 2. | 0.08 | 39 | 15.1 | 44 | 209 | 240 | 231 | 419 | 459 | 359 |
| 3. | 0.11 | 44 | 15.4 | 47 | 201 | 141 | 224 | 380 | 371 | 370 |
| 4. | 0.04 | 26 | 1.7 | 29 | 251 | 289 | 302 | 461 | 530 | 579 |
| 5. | 0.05 | 26 | 1.9 | 33 | 252 | 271 | 281 | 465 | 491 | 500 |
| 6. | 0.06 | 27 | 2.3 | 37 | 251 | 260 | 248 | 461 | 482 | 438 |

TABLE 2-continued

| Ex. | Density (g/cm³) | Shock-absorbing Properties | | Foamed Product Surface Hardness *² | Dimensions (mm) | | | | | |
|---|---|---|---|---|---|---|---|---|---|---|
| | | G*¹ | Strain(%) | | A | B | C | D | E | F |
| 7.  | 0.07 | 30 | 3.7  | 41 | 247 | 241 | 243 | 431 | 435 | 439 |
| 8.  | 0.06 | 29 | 3.9  | 38 | 262 | 280 | 253 | 472 | 501 | 477 |
| 9.  | 0.07 | 32 | 4.0  | 41 | 251 | 260 | 240 | 460 | 469 | 437 |
| 10. | 0.08 | 33 | 4.1  | 45 | 241 | 239 | 239 | 439 | 435 | 437 |
| 11. | 0.07 | 31 | 4.0  | 41 | 250 | 261 | 264 | 449 | 487 | 470 |
| 12. | 0.08 | 33 | 4.1  | 45 | 239 | 245 | 255 | 441 | 455 | 451 |
| 13. | 0.09 | 35 | 4.1  | 47 | 235 | 239 | 240 | 430 | 432 | 436 |
| 14. | 0.12 | 37 | 5.1  | 50 | 257 | 260 | 258 | 431 | 431 | 427 |
| 15. | 0.15 | 41 | 7.3  | 62 | 198 | 205 | 200 | 375 | 373 | 377 |
| 16. | 0.18 | 44 | 11.2 | 67 | 195 | 197 | 195 | 357 | 354 | 354 |
| 17. | 0.21 | 47 | 17.8 | 73 | 183 | 187 | 185 | 330 | 332 | 331 |
| 18. | 0.08 | 36 | 12.1 | 47 | 261 | 250 | 265 | 466 | 461 | 490 |
| 19. | 0.09 | 39 | 13.6 | 51 | 249 | 255 | 251 | 442 | 450 | 471 |
| 20. | 0.10 | 41 | 15.9 | 57 | 235 | 239 | 240 | 435 | 436 | 440 |
| 21. | 0.15 | 47 | 17.1 | 69 | 230 | 216 | 214 | 388 | 387 | 391 |
| 22. | 0.20 | 51 | 19.9 | 77 | 195 | 200 | 191 | 357 | 356 | 358 |
| 23. | 0.19 | 49 | 16.3 | 69 | 197 | 198 | 196 | 359 | 360 | 362 |
| 24. | 0.18 | 52 | 17.9 | 70 | 192 | 194 | 195 | 351 | 356 | 353 |

Note:
*¹ Measured according to ASTM-D-1596 (1964); Thickness of sample tested: 60 mm Height of Drop: 60 cm
*² Japan Rubber Association SRIS-0101, measured by C type durometer The results shown in Table 2 clearly suggest that deformation of the thus obtained molding is significant when only polyethylene resin is used. Deformation is still significant when the resin is mixed with a small amount of inorganic calcium compound. However, when a relatively large amount of inorganic calcium compound is mixed, the deformation is slight and a favorable molding can be obtained.

What is claimed is:

1. Method of preparing a foamed polyethylene resin product which accurately conforms to the dimensions of a mold cavity, which comprises the steps of:
    a. mixing together 100 weight parts of polyethylene resin, from 30 to 70 weight parts of an inorganic calcium compound selected from the group consisting of calcium sulfite, calcium sulfate and calcium carbonate, from 1.5 to 6.0 weight parts of a foaming agent and from 0.15 to 0.5 weight parts of a cross-linking agent,
    b. charging the mixture resulting from step (a) to a closed mold with a predetermined shape;
    c. foaming said mixture in the mold under a pressure at an elevated temperature; and
    c. subsequently opening the mold instantaneously.

2. The method as claimed in claim 1, wherein polyethylene resin is a member selected from the group consisting of polymer of ethylene, copolymer of ethylene and vinyl acetate and blend of said polymer and copolymer.

3. The method as claimed in claim 1, wherein said foaming step is carried out under a pressure of from 10 to 10 kg/cm² at a temperature of from 180° to 200°C for from 10 to 25 minutes.

4. The method, as claimed in claim 1, wherein the inorganic calcium compound is calcium sulfite.

5. The method, as claimed in claim 1, wherein mixing of step (a) is carried out at a temperature of from about 90° to about 100°C.

6. The method as claimed in claim 1, wherein foaming step (c) is carried out under pressure at a temperature of from about 180° to about 200°C.

* * * * *